United States Patent [19]

Oberg

[11] Patent Number: 4,937,564

[45] Date of Patent: Jun. 26, 1990

[54] DIRECTION SENSITIVE INPUT SYSTEM FOR A COMPUTER

[76] Inventor: Artur E. Oberg, 1234 S. Dale St., #106, Anaheim, Calif. 92804

[21] Appl. No.: 297,033

[22] Filed: Jan. 17, 1989

[51] Int. Cl.$^5$ ............................................. G09G 3/02
[52] U.S. Cl. .................................. 340/706; 340/709; 340/710; 273/148 B
[58] Field of Search ................... 200/17,18, 61.58 R, 200/517, 330, 337; 235/145 R, 146; 340/709, 706, 710, 711; 364/709.12, 709.15, 709.01, 709.02; 400/472, 473; 74/471, 471 R; 273/148 B

[56] References Cited

U.S. PATENT DOCUMENTS

| | | | |
|---|---|---|---|
| 3,720,801 | 3/1973 | Yanaga | 200/330 |
| 3,806,685 | 4/1974 | Seeger, Jr. et al. | 200/517 X |
| 4,575,591 | 3/1986 | Lugaresi | 200/330 X |
| 4,799,049 | 1/1989 | Avila | 340/709 |
| 4,823,634 | 4/1989 | Culver | 340/706 X |

*Primary Examiner*—J. R. Scott
*Attorney, Agent, or Firm*—Moreland C. Fischer

[57] ABSTRACT

An efficient, manually activated direction sensitive input system having particular application to a computer to enable a computer operator to selectively and easily initiate one of a plurality of available software controlled functions. The input system comprises a contact bar which is located at the front of the computer keyboard to be interfaced with and movable relative to an array of electrical switches located at the interior of the keyboard. The contact bar is readily accessible to the computer operator for movement in one of several directions to actuate a respective switch or combination of switches of the array and thereby initiate a corresponding software controlled function. The present direction sensitive input system is a convenient, space conserving alternative to the remotely located switches of a conventional mouse system that have heretofore been associated with some computers.

18 Claims, 4 Drawing Sheets 4,937,564

DIRECTION SENSITIVE INPUT SYSTEM FOR A COMPUTER

BACKGROUND OF THE INVENTION

1. Field of the Invention

This invention relates to a manually activated direction sensitive input system having a contact surface that is movably attached across the front of a computer keyboard so as to be conveniently and easily accessible to a computer operator for selectively initiating one of a plurality of available software controlled functions.

2. Background Art

As will be known to those skilled in the art, a computer input device commonly referred to as a "mouse" is sometimes connected to a personal computer to enable a computer operator to selectively initiate a software controlled function. The mouse typically includes one or more push button switches to complement the input of its rotatable ball. By moving the mouse and properly activating a switch, the computer operator has the ability to selectively control the operation of the computer with which the mouse is associated.

The mouse is usually positioned remotely from the computer by means of an electrical wire or cable. Thus, the computer operator must remove his hands from the computer keyboard and his eyes from the computer monitor in order to visually locate and manually operate the mouse. These steps interrupt the computing process, introduce wasteful delay, and interfere with the concentration of the operator, particularly when the mouse must be frequently accessed. What is more, the mouse typically consumes a relatively large amount of space peripheral to the computer. With the advent of smaller personal computers, it is desirable to avoid space consuming peripheral devices. More particularly, if a laptop computer is to be used on an airplane, or the like, there may be little additional room for a mouse, without subjecting the computer operator to both inconvenience and inefficiency.

The present direction sensitive input system overcomes the foregoing problems and the inefficiencies associated therewith by consuming virtually no additional space and by having a convenient and easily accessible location relative to the computer so as to avoid the loss of concentration and the need for the operator to remove his hands and eyes from the computer in order to gain access to the switch system.

SUMMARY OF THE INVENTION

In general terms, an efficient direction sensitive input system is disclosed to be associated with a personal computer, such as a latop computer, or the like, to enable the computer operator to selectively initiate one of plurality of software controlled functions. The system comprises an elongated contact bar which is connected across and spaced slightly from the front of the computer keyboard so as to be readily and conveniently accessible to the computer operator. The contact bar is movable with respect to an array of single pole, double throw switches that are fixedly retained within the computer keyboard. A spring biased linking assembly extends between the contact bar at the front of the keyboard and the switch array at the interior of the keyboard to translate a movement of the contact bar into the actuation of one or more switches from the array thereof. More particularly, the contact bar is movable against the normal spring bias of the linking assembly, whereby the linkig assembly is moved in a corresponding direction so as to contact and depress the respective push button of at least one of said switches.

In operation, and in order to initiate a particular software controlled function, the computer operator merely slides his thumbs downwardly along the keyboard until the contact bar is located. The operator may then displace the contact bar upwardly or downwardly or push the bar inwardly towards the keyboard to cause a corresponding movement of the linking assembly with respect to the switch array to thereby depress the push buttons of one or more switches from the array. Conventional sensing circuitry detects which switch or switches are in a depressed state and generates a suitably encoded signal to the computer to initiate a corresponding software controlled function (e.g. changing the display). Hence, the operator can select a particular function to be initiated by moving the contact bar in one or more pre-determined directions to depress the push buttons of one or more level switches. When the operator releases the control bar, the normal spring bias of the linking assembly and the switch push buttons cause the control bar to be automatically returned to its at rest position so that the computing operation may be resumed with minimal delay and maximum efficiency relative to the conventional computer related mouse.

DESCRIPTION OF THE PREFERRED EMBODIMENT

Figure 1:
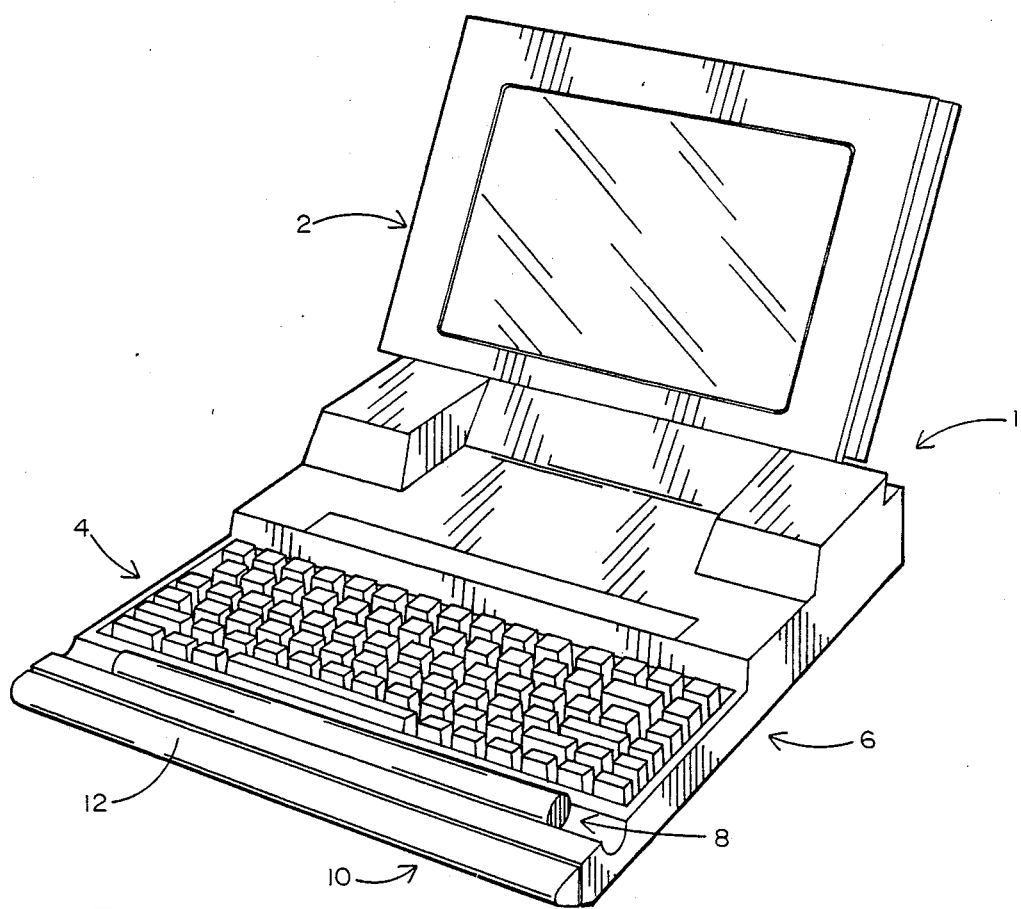
FIG. 1 is illustrative of a personal computer of the type to which the present direction sensitive input system is applicable.

The direction sensitive input system 10 of the present invention, by which different software controlled functions may be selectively initiated on a computer, is described while referring to the drawings, where FIG. 1 is illustrative of a portable (e.g. laptop) personal computer 1. Although the computer 1 illustrated in FIG. 1 is of the portable laptop type, this is not to be regarded as a limitation of the present invention, and it is to be understood that the soon to be described input system 10 may be associated with any computer, especially those which have heretofore had computer functions selectively controlled by what is commonly known in the art as a "mouse". Computer 1 has the conventional components, including a monitor 2, a keyboard 4, and a housing 6 in which the computer software and hardware is located. Computer 1 is also provided with an optional image position control system 8 by which the position of a video cursor may controllably moved on the monitor 2. The optional image position control system 8, which translates lateral and rotational movements of a cylindrical bar into corresponding movements of the cursor, is fully described in U.S. Pat. No. 4,799,049 issued January 17, 1989 and no further description thereof will be provided below.

Figure 2:
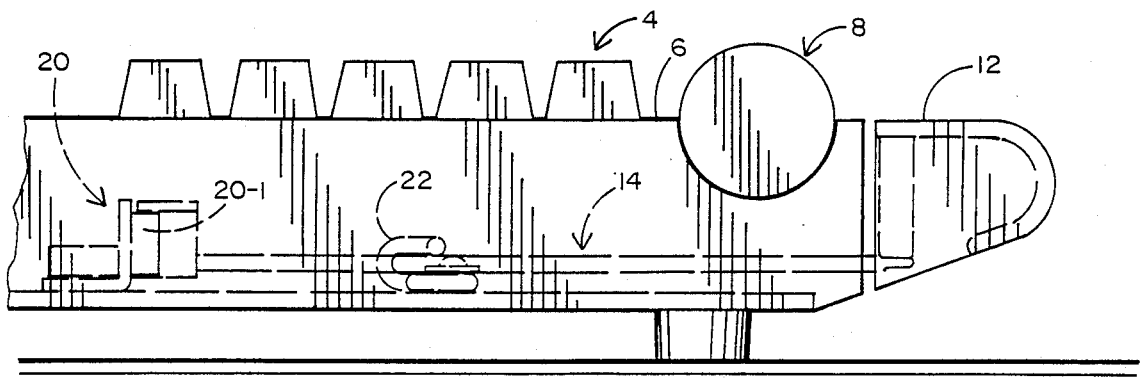
FIG. 2 is a side view of the computer and input system of FIG. 1.

The direction sensitive input system 10 of the present invention for controlling computer 1 is initially disclosed while referring currently to FIGS. 1 and 2 of the drawings. Input system 10 includes a manually operable contact surface which, in a preferred embodiment, comprises an elongated bar 12. Contact bar 12 is disposed across the front of and spaced slightly from the computer keyboard 4 so as to be readily and conveniently accessible to the computer operator. More particularly, the contact bar 12 is mechanically interfaced with and movable relatively to an array of switches 20 by means of a spring biased linking assembly 14. Linking assembly 14 extends from the contact bar 12 at the front of the keyboard 4, through the keyboard, to the array of switches 20 which are fixedly retained therewithin.

In its at rest position, as illustrated in FIG. 2, the contact bar 12 is arranged in spaced, parallel alignment with the front of keyboard 4. However, and as will be described in greater detail hereinafter, when referring to FIGS. 5–7, contact bar 12 is characterized by multiple degrees of freedom so as to be adapted to be manually accessed by the computer operator and moved in at least one of three different directions relative to keyboard 4 to selectively actuate at least one of the switches 20 from the switch array and thereby initiate a corresponding software controlled function of the computer 1.

Figure 3:
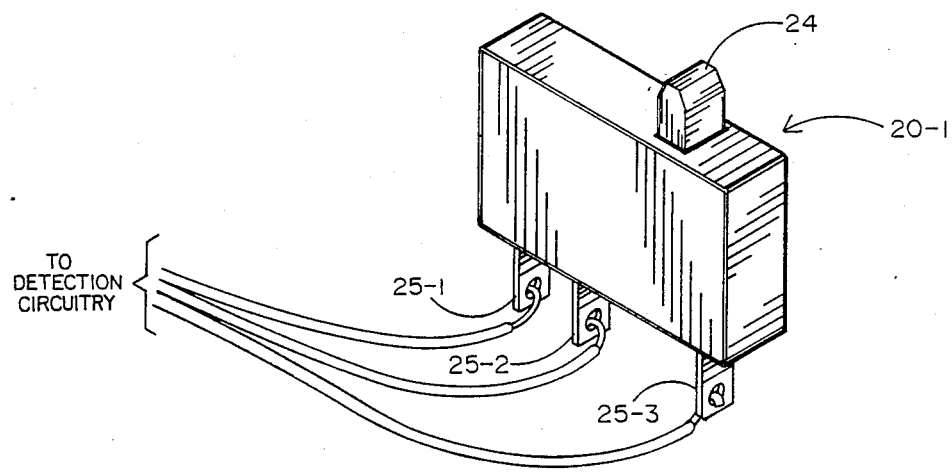
FIG. 3 shows a switch of the type which may be utilized within the input system of FIG. 1.

The switch array 20 within the housing 6 of the computer 1 includes three single pole, double throw switches 20-1, 20-2 and 20-3. As is best shown in FIG. 3, each switch (e.g. 20-1) includes a push button 24 and three terminals 25-1, 25-2 and 25-3. In general terms, when the switch 20-1 is at rest, such that its push button 24 is released, electrical contact is established between terminal 25-1 and one of the terminals 25-2 or 25-3, whereby switch 20-1 exhibits a first resistance level at said terminals. When push button 24 is otherwise depressed, electrical contact is established between terminal 25-3 and the other one of the terminals 25-1 or 25-2, whereby the resistance exhibited by switch 20-1 at such terminals changes to a second level. Conventional detection circuitry including resistance responsive electronics is interconnected with the terminals 25-1, 25-2 and 25-3 by respective wires of a ribbon cable for detecting a change in the resistance exhibited by each switch to indicate whether the push buttons 24 thereof are in the released or the depressed state. The detection circuitry is interconnected with a compatible signal generator which is adapted to generate signals that are reflective of the detected depressed or released states of switches 20. The signals are transmitted from the signal generator to the computer to initiate a corresponding software controlled function, such as, for example, displaying a menu or a drawing or changing the image on the monitor. By way of example, the resistance responsive circuitry and the signal generating and transmitting means for causing the computer to initiate a software controlled function, as just described, may be indentical to that found in a computer mouse when one or more of its buttons are to be depressed.

While the switches 20-1, 20-2 and 20-3 of the switch array 20 have been shown and described as being single pole, double throw switches, it is to be understood that other types of switches having a variety of switch terminals and pole positions (e.g. membrane switches, capacitance sensing switches, dome switches, and the like) may also be employed herein. Moreover, by using a total of three switches, the input system 10 of the present invention can emulate the three switches that are associated with certain conventional mouses.

Figure 4:
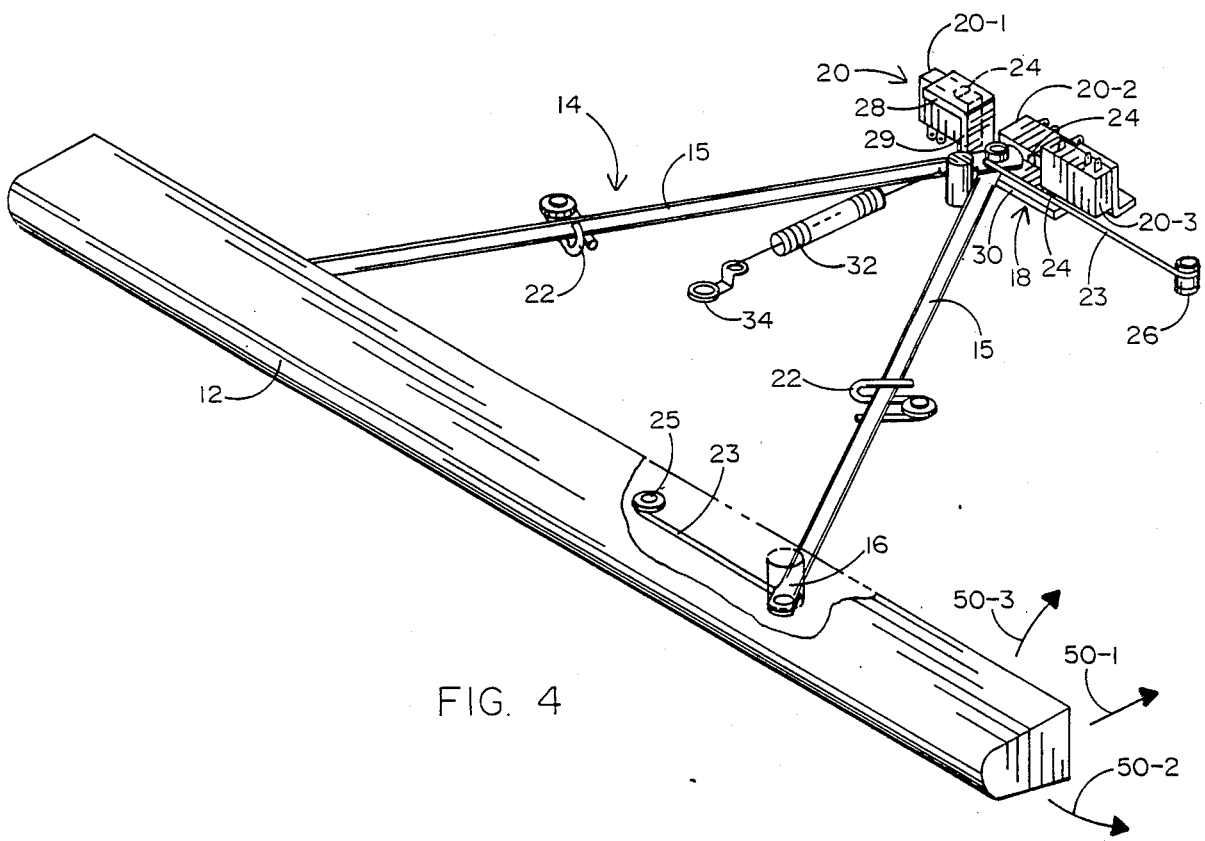
FIG. 4 is a perspective view of the input system of the present invention in the at rest position.

The linking system 14 which interfaces the movable control bar 12 at the exterior of the computer keyboard with the array of stationary switches 20-1, 20-2 and 20-3 at the interior of said keyboard is described in detail while referring to FIG. 4 of the drawing. Linking system 14 includes a pair of motion transmitting arms 15 which are interconnected with each other in a V-shaped configuration. That is, each motion transmitting arm 15 is connected at one end thereof to a respective end of contact bar 12 by means of a post 16, or the like. The opposite ends of motion transmitting arms 15 are connected together at a movable switch control plate 18, whereby the movement of said plate can be controlled by the contact bar 12 via the motion transmitting arms 15. The arms 15 are seated upon and spaced from the base of the computer keyboard (as best illustrated in FIG. 2) by respective supports 22. One end of each support 22 is affixed to the base of the keyboard, while the opposite end thereof is hook-shaped to receive and support a motion transmitting arm 15 so that said arm 15 may slide linearly therethrough in response to movement of contact bar 12 in a direction towards the keyboard. Moreover, and as an important aspect of the present invention, the supports 22 also function as fulcrums around which the motion transmitting arms 15 may pivot in response to an upward or downward displacement of the contact bar 12 relative to the keyboard.

The V-shaped configuration of motion transmitting arms 15 prevents one end of the contact bar 12 from twisting or rotating relative to the opposite end when the computer operator pushes or rotates said first end. Thus, and as will soon be described, rotational or linear forces applied to contact bar 12 at either end thereof will be uniformly translated by linking assembly 14 into the actuation of a respective one of the switches 20-1, 20-2 or 20-3, depending only upon the direction in which contact bar 12 is moved in response to said applied force.

A pair of flexible bars 23 are interconnected with the motion transmitting arms 15 to assure that a linear or rotational force being manually applied to either end of the arms will be accurately reflected and transmitted to the switches 20-1, 20-2 and 20-3. The flexible bars 23 are connected in parallel alignment with one another at opposite ends of the V-shaped configuration of the motion transmitting arms 15, such that said arms will move in unison in response to a force applied to contact bar 12. That is, a first flexible bar 23 extends between a mounting post 25 and a first end of a motion transmitting arm 15. The second flexible bar 23 is connected between a mounting post 26 and the opposite end of such motion transmitting arm 15 (e.g. at the common connection of the pair of motion transmitting arms).

FIG. 4 shows the linking assembly 14 and the array of switches 20 of the input system of the present invention in the at rest position with contact bar 12 disposed in spaced, parallel alignment with the computer keyboard (as best depicted in FIG. 2). The switches 20-1, 20-2 and 20-3 of switch array 20 are disposed within the computer keyboard such that the push buttons 24 thereof are in the released state. More particularly, each switch of the switch array 20 is affixed to the base of the computer keyboard such that the respective push buttons 24 are oriented in different directions. By way of example, the push button 24 of switch 20-1 projects upwardly, the push button 24 of switch 20-2 projects laterally towards contact bar 12, and the push button 24 of switch 20-3 projects downwardly.

As previously disclosed, the motion transmitting arms 15 are connected together at a movable switch control plate 18. That is, switch control plate 18 is moved by means of motion transmitting arms 15 to translate a displacement of contact bar 12 into the actuation of a particular switch from the switch array 20. The switch control plate 18 is generally z-shaped having horizontally extending head and tail portions 28 and 30 that are spaced from one another by a vertically extending neck 29. The switch control plate 18 provides contact surfaces which, in the at rest configuration of FIG. 4 are in spaced alignment with the respective push buttons 24 of the switches from array 20. That is to say, the horizontally extending head portion 28 of switch control plate 18 is spaced above the push button 24 of switch 20-1, the horizontally extending tail portion 30 of plate 18 is spaced below the push button 24 of switch 20-3, and the outside edge of plate 18 is spaced laterally from the push button 24 of switch 20-2. As will be described when referring to FIGS. 5-7, the movement of switch control plate 18 in response to the movement of control bar 12 will cause one of the contact surfaces of plate 18 to move towards and depress the push botton 24 of one of the switches from the switch array 20, whereby to activate the switch and initiate a particular software controlled function of the computer which corresponds to the switch being actuated.

Linking system 14 is biased by a compression spring 32 which extends between a mounting post 34 at the base of the computer housing and the common connection of the motion transmitting arms 15. In the at rest configuration of FIG. 4, the compression spring 32 normally biases the linking assembly 14 such that the contact bar 12 is positioned in spaced, parallel alignment with the keyboard (best shown in FIG. 2), and the switch control plate is positioned such that the contact surfaces at the head 28, tail 30 and outside edge thereof are aligned with, but spaced from, the respective push buttons 24 of the switches 20-1, 20-2 and 20-3.

Figure 5:
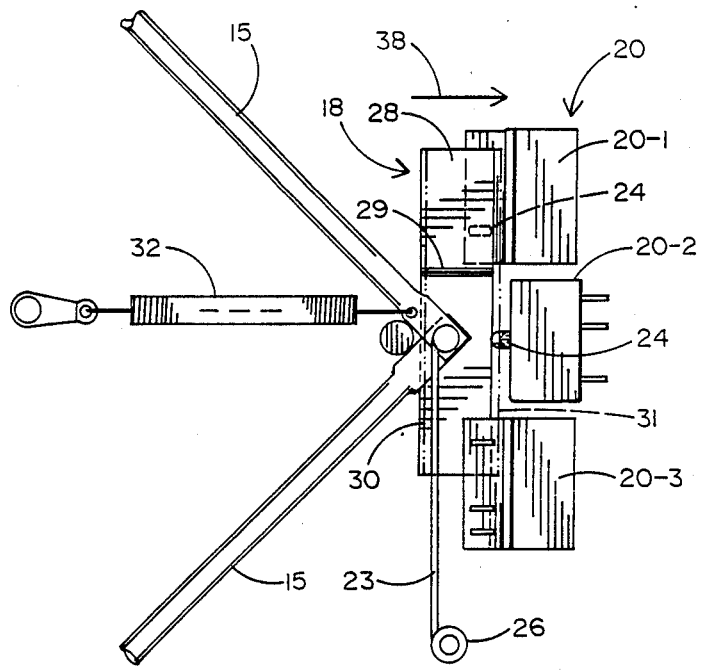
FIGS. 5-7 illustrate the input system of FIG. 4 moving in three different directions relative to the computer for actuating respective switches and initiating corresponding software controlled computer functions.

More particularly, and referring to FIG. 5 of the drawings, the computer operator may wish to initiate a particular software controlled function of the computer by means of moving the contact bar (12 of FIG. 4) in an inward direction (designated 50-1 in FIG. 4) towards the keyboard. Therefore, the operator merely pushes inwardly upon the contact bar, whereby the motion transmitting arms 15 are correspondingly relocated in a linear direction and the switch control plate 18 is moved, in the direction of reference arrow 38 and against the normal bias of spring 32, towards the switch array 20. The movement of switch control plate 18 (as indicated in phantom) towards the array of switches 20 causes the contact surface at the outside edge 31 of plate 18 to move into contact with against the normal spring bias of the push button 24 of switch 20-2. Accordingly, the push button 24 is depressed and switch 20-2 is actuated to produce an output signal (as previously described while referring to FIG. 3) so that a corresponding software controlled function may be initiated. When the computer operator releases the contact bar, the spring memories of spring 32 and push button 24 automatically return the contact bar, the motion transmitting arms 15 and the switch control plate 18 to the at rest position of FIG. 4, whereupon the push button 24 of switch 20-2 returns to its released state.

Figure 6:
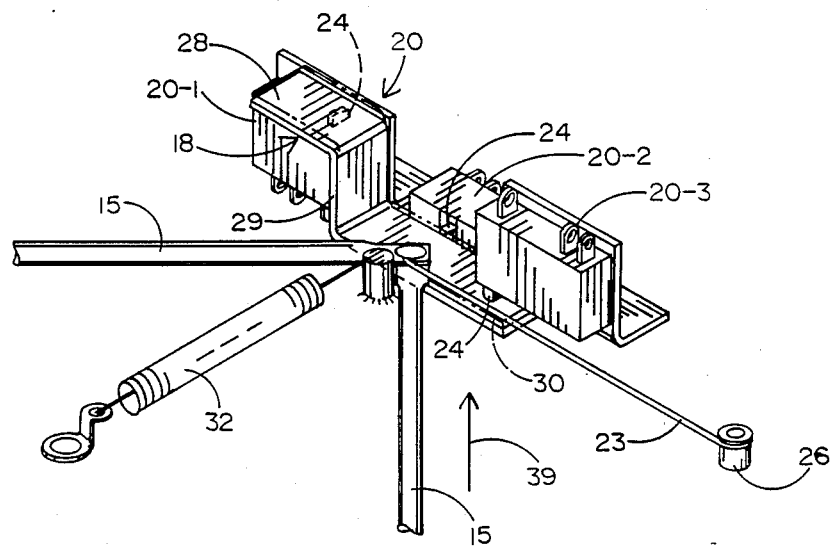

Referring now to FIG. 6 of the drawings, the computer operator may wish to initiate a particular software controlled function of the computer by means of displacing the contact bar (12 of FIG. 4) in a downward direction (designated 50-2 in FIG. 4) relative to the keyboard. Therefore, the operator merely pushes downwardly on the contact bar, whereby the motion transmitting arms 15 are correpondingly pivoted in a upward direction (around the supports 22 of FIG. 4) and the switch control plate 18 is moved, in the direction of reference arrow 39 upwardly relative to the switch array 20. The upward movement of switch control plate 18 (as indicated in phantom) causes the contact surface at the horizontal tail 30 of plate 18 to move into contact with, and against the normal spring bias of, the push button 24 of switch 20-3. Accordingly, the push button 24 is depressed and switch 20-3 is actuated to produce an output signal so that a corresponding software controlled function may be initiated. When the computer operator releases the contact bar, the spring memory of push button 24 automatically returns the contact bar, the motion transmitting arms 15 and the switch control plate 18 to the at rest position of FIG. 4, whereupon the push button 24 of switch 20-3 returns to its released state.

Figure 7:
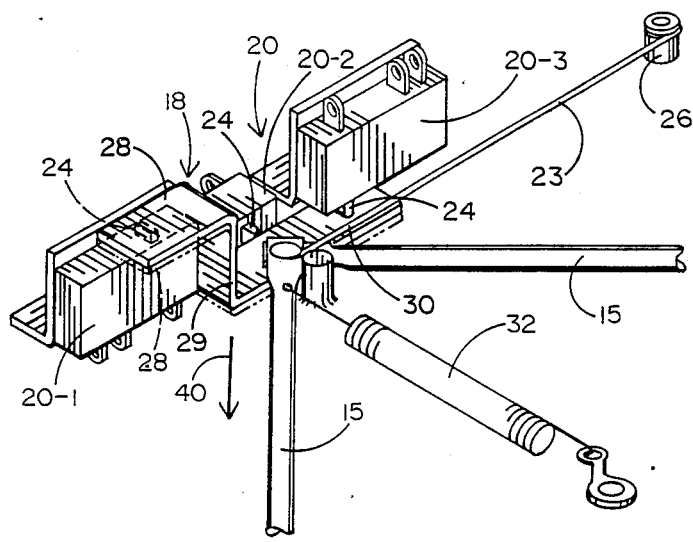

In FIG. 7 of the drawings, the computer operator may wish to initiate a particular software controlled function of the computer by means of displacing the contact bar (12 of FIG. 4) in an upward direction (designated 50-3 in FIG. 4) relative to the keyboard. Therefore, the operator merely pushes upwardly on the contact bar, whereby the motion transmitting arms 15 are correspondingly pivoted in a downward direction (around the supports 22 of FIG. 4) and the switch control plate 18 is moved, in the direction of reference arrow 40 downwardly relative to the switch array 20. The downward movement of switch control plate 18 (as indicated in phantom) causes the contact surface at the horizontal head portion 28 to move into contact with, and against the normal spring bias of, the push button 24 of switch 20-1. Accordingly, the push button 24 is depressed and switch 20-1 is actuated to produce an output signal so that a corresponding software controlled function may be initiated. When the computer operator releases the contact bar, the spring memory of the push button 24 automatically returns the contact bar, the motion transmitting arms 15 and the switch control plate 18 to the at rest position of FIG. 4 whereupon the push button 24 of switch 20-1 returns to its released state.

It has been disclosed herein that the contact bar 12 is selectively movable in any one of at least three different directions (i.e. upwardly, downwardly or inwardly) to depress the respective push buttons 24 of three switches 20-1, 20-2 and 20-3 and thereby initiate a corresponding software controlled function of the computer. However, it is also possible to move the contact bar 12 in two directions simultaneously (e.g. upwardly and inwardly or downwardly or inwardly) so that the push buttons of a pair of the switches may be concurrently depressed. In this manner, the contact bar 12 may be moved in a total of five different directions to increase the flexibility of the input system of the present invention and enable a relatively large number of software controlled functions to be quickly and easily initiated. Moreover, and unlike the mouse, the directional unput system of this invention always returns to its initial, at rest configuration (of FIG. 1) after use. What is more, the operator may also use the image position control system (designated 8 in FIG. 1) in much the same way as a rolling ball is used in some conventional mouses. Thus, the image position control system 8 and input system 10 of FIG. 1 may be used sequentially with one another as an efficient space conserving, easily accessible means by which to replace the remotely located mouse.

It will be apparent that while a preferred embodiment of the invention has been shown and described, various modifications and changes may be made without departing from the true spirit and scope of the invention.

Having thus set forth a preferred embodiment of the invention, what is claimed is:

1. For a microprocessor based system including control electronics and a manually operated input device having a housing and being electrically connected to the control electronics to supply information signals thereto, a direction sensitive input system by which to control the operation of the microprocessor based system, said input system comprising:
    manually accessible contact surface means located outside the housing of the input device and being movable in at least two non-colinear directions;
    switch means located inside the housing of the input device and electrically connected to the control electronics of said microprocessor based system; and
    linking assembly means extending between said contact surface means and said switch means, said linking assembly means being moved by said contact surface means in at least two non-colinear directions corresponding to the at least two non-colinear directions of movement of said contact surface means, said switch means having means responsive to the movement of said linking assembly means in each of said two non-colinear directions to activate corresponding circuits of the control electronics of said microprocessor based system and thereby control the operation thereof.

2. The input system recited in claim 1, wherein the manually operated input device is a keyboard, said contact surfacr means being arranged in spaced, parallel alignment to the housing of the keyboard.

3. The input system recited in claim 2, wherein said contact surface means in movable inwardly, upwardly and downwardly relative to keyboard, said inward direction being non-colinear to each of said upward and downward directions.

4. The input system recited in claim 2, wherein said contact surface means is an elongated bar, said linking assembly means extending through the housing of the keyboard for connection between said bar at the outside of the housing of the keyboard and said switch means at the inside of the housing of the keyboard.

5. The input system recited in claim 4, further comprising means located within the housing of the keyboard for receiving and supporting said linking assembly means, said linking assembly means moving linearly past said receiving and supporting means when said contact surface means is moved inwardly towards the keyboard, and said receiving and supporting means forming a pivot surface around which said linking assembly means can rotate when said contact surface means is moved upwardly or downwardly relative to the keyboard.

6. The input system recited in claim 1, wherein said switch means includes at least two electrical switches having respective direction responsive means that are selectively actuated to activate corresponding circuits of the control electronics of said microprocessor based system depending upon the particular direction in which said linking assembly means is moved by said contact surface means, the actuation of a direction responsive means causing its respective switch to close and thereby activate a corresponding circuit of the control electronics.

7. The input system recited in claim 6, wherein said at least two switches are fixedly attached within the housing of the input device, and said linking assembly means is spaced from and selectively movable into contact with the respective direction responsive means of said switches inside the housing of the input device.

8. The input system recited in claim 7, wherein said at least two switches are push button switches and said direction responsive means thereof are push buttons that are aligned with one another in different directions, said linking assembly means comprising a switch plate surface and a motion transferring arm that is connected from said contact surface means to said switch plate surface, such that a movement of said linking assembly means in any one of said non-colinear directions causes said switch plate surface to be moved into contact with and actuate a respective one of the push buttons of said push button switches.

9. A direction sensitive input system to control the operation of an electronic computer having a houseing in which the computer electronics are contained, said direction sensitive input system comprising:
    contact surface means located at the outside of the computer housing and capable of being moved in a plurality of different directions;
    switch means located at the inside of the computer housing and electrically connected to the computer electronics therewithin, said switch means having a plurality of direction responsive means that are aligned in a plurality of different directions corresponding to the plurality of directions in which said contact surface means is capable of being moved; and
    linking assembly means extending between said contact surface means and said switch means, said linking assembly means being moved by said contact surface means in a plurality of directions corresponding to the plurality of directions in which said contact surface means is moved, such that the respective direction responsive means of said switch means are selectively actuated to complete corresponding circuits of the computer electronics depending upon the direction in which said contact surface means is moved relative to the directions in which said plurality of direction responsive means are aligned.

10. The input system recited in claim 9, wherein said contact surface means is spaced from and movable relative to the computer housing in three directions, said contact surface means moving said linking assembly means in three directions corresponding to the three directions in which said contact surface is movable.

11. The input system in claim 10, wherein at least two of the three directions in which said contact surface means is moved are non-colinear relative to one another.

12. The input system recited in claim 11, wherein said three directions of movement of said contact surface means are inwardly towards the computer housing and upwardly and downwardly relative to the computer housing, said inward direction being non-colinear to each of said upward and downward directions.

13. The input system recited in claim 12, further comprising support surface means located within the computer housing and having means by which to receive said linking assembly means at the inside of said housing, said linking assembly means moving linearly past said support surface means when said contact surface means is moved towards the computer housing in a first of said three directions of movement, and said linking assembly means pivoting around said support surface means when said contact surface means is moved upwardly or downwardly relative to the computer housing in the second or thrid of said three directions of movement.

14. The input system recited in claim 9, wherein said switch means includes a plurality of electical switches having respective direction responsive means that are aligned in different directions so as to be selectively actuated depending upon the particular direction in which said linking assembly means is moved by said contact surface means, the actuation of a direction responsive means causing its respective switch to close and thereby complete a corresponding circuit of the computer electronics.

15. The input system recited in claim 14, wherein said plurality of switches are fixedly attached within the computer housing and said linking assembly means extends through said housing so as to be spaced from and selectively moved into contact with respective ones of the direction responsive means of said switches for actuating particular direction responsive means depending upon the direction in which said linking assembly means is moved by said contact surface means.

16. The input system recited in claim 15, wherein said linking assembly means comprises a motion transferring arm connected to said contact surface means and a plurality of switch plate surfaces affixed to and movable with said motion transferring arm, one of said plurality of switch plate surfaces moving into contact with and actuating the direction responsive means from a particular one of said plurality of switches depending upon the direction in which the motion transferring arm of said linking assembly means is moved by said contact surface means.

17. The input system recited in claim 16, wherein said plurality of switches are push button switches and the direction responsive means thereof are respective push buttons, the plurality of switch plate surfaces of said linking assembly means moving into contact with and depressing respective ones of said push buttons.

18. For an electronic computer including a housing in which the computer electronics are contained and a video display at which computer information is displayed, a direction sensitive input system for controlling the information displayed at the video display, said system comprising:

manually accessible contact surface means located outside the computer housing and capable of being moved relative to the housing;

switch means located inside the computer housing and having direction responsive means, said switch means being connected to the computer electronics; and linking assembly means including a motion transferring arm connected to said contact surface means at a location outside the computer housing and a switch plate surface connected to said motion transferring arm at a location inside the computer housing, said switch plate surface being moved relative to said switch means by said contact surface means, and the direction responsive means of said switch means being responsive to the direction in which said switch plate surface is moved for actuating said switch means when said switch plate surface is moved in particular direction to activate a corresponding circuit of the computer electronics that controls the information displayed at the video display.

* * * * *